`United States Patent Office`

3,851,001
Patented Nov. 26, 1974

3,851,001
HYDROGENATION OF AROMATIC HYDROCARBONS TO THE CORRESPONDING SATURATED HYDROCARBON
Robert M. Suggitt, Wappingers Falls, N.Y., assignor to Texaco Inc., New York, N.Y.
No Drawing. Filed Oct. 31, 1973, Ser. No. 411,551
Int. Cl. C07c 5/10
U.S. Cl. 260—667             7 Claims

ABSTRACT OF THE DISCLOSURE

Aromatic hydrocarbons are hydrogenated to corresponding saturated hydrocarbon with high selectivity using a noble metal catalyst promoted with a minor amount of thallium.

---

This invention relates to the hydrogenation of aromatic compounds. More particularly, it is concerned with the production of cyclohexane from benzene. In its most specific aspect, it is concerned with the production of cyclohexane in a purity of at least 99.75%.

The hydrogenation of aromatic compounds is well known and has been disclosed in the prior art. In earlier processes an aromatic hydrocarbon such as benzene or toluene was contacted with hydrogen in the presence of a hydrogenation catalyst at an elevated temperature and pressure with good conversion to the corresponding saturated compound. However, side reactions such as cracking with the production of normal paraffins and isomerization with the production of alkyl cyclopentanes and, in the case of excessively high temperatures, the formation of $C_5$ and lighter hydrocarbons took place. More recently, for the use of cyclohexane as an intermediate for the production of chemicals such as polyamides it is desirable to produce cyclohexane in as high a purity as possible. It was subsequently found that to this end it was necessary to control the reaction temperature in known processes to a maximum of about 500° F. as otherwise the various undesirable side reactions would take place resulting in a product of lower purity. Since hydrogenation is a highly exothermic reaction, to maintain the reaction temperature below 490° F. various devices were used such as multiple catalyst beds with inter-bed heat exchange and cooling of the reactant stream, tubular reactors in which the catalyst was placed in tubes surrounded by a cooling medium or product injection into the reactant stream at various points for cooling purposes. Eventually the preferred procedure came to be the use of multiple catalyst beds such as disclosed in U.S. Pat. 3,254,134 with the introduction of a mixture of the feed and product into the multiple catalyst bed unit and with the introduction of product between the beds for the purpose of cooling the reactant stream to maintain it below 490° F. This unfortunately meant that a large volume of material was being passed through the catalyst bed only a small portion of which was actually being hydrogenated, in effect resulting in a low space velocity. The temperature restriction was also an undesirable limitation on reaction conditions.

It is therefore an object of the present invention to provide a novel process for the hydrogenation of aromatic compounds. It is a further object of the present invention to convert benzene, toluene and xylenes to the corresponding saturated cyclic hydrocarbons. It is a further object of the present invention to produce saturated cyclic compounds of a purity of at least 99.5%. Still another object is to convert unsaturated aromatic hydrocarbons to the corresponding saturated hydrocarbons at temperatures between about 200 and 600° F. with a minimum production of undesirable byproducts. These and other objects will be obvious to those skilled in the art from the following disclosure.

According to our invention saturated cyclic hydrocarbon compounds are produced by a process which comprises contacting the corresponding aromatic hydrocarbon compound in the presence of hydrogen under hydrogenating conditions with a hydrogenating catalyst comprising a noble metal supported on a refractory inorganic oxide and promoted with a minor amount of thallium to effect substantially complete hydrogenation and recovering substantially pure saturated hydrocarbon compound from the effluent from the hydrogenation zone.

In a preferred embodiment of our invention benzene feed diluted with cyclohexane product is introduced into a catalytic hydrogenation zone at a temperature between about 250 and 350° F. in the presence of an excess of hydrogen, where it is contacted with a platinum on alumina catalyst containing a small amount of thallium. The reactant stream leaves the hydrogenation zone at a temperature up to about 600° F. After cooling, the excess hydrogen is flashed off leaving as liquid product substantially pure cyclohexane, a portion of which may be recycled for introduction into the hydrogenation zone with fresh feed. The hydrogen may also be recycled to the hydrogenation zone.

One of the features of our invention is that since the catalyst can operate efficiently at a higher temperature there can be a much greater $\Delta T$ across the reaction zone. For example, if the inlet temperature is 225° F. and the final temperature is 600° F. there is a $\Delta T$ of 375° F. Accordingly, it is not necessary to dilute the benzene charge with cyclohexane to the extent necessary when prior art catalysts are used. Correspondingly, the amount of benzene present in the charge can be increased thereby permitting a greater feed rate of benzene than would ordinarily be possible when using a prior art catalyst. In this way, the amount of benzene which can be hydrogenated per unit volume of reactor space is correspondingly increased.

Any aromatic hydrocarbon such as benzene, toluene or xylene may comprise the feed to the hydrogenation zone. In a preferred embodiment the feed to the process of our invention is benzene obtained from the catalytic reforming of a petroleum naphtha and recovered from the reformate by solvent extraction. Ordinarily this benzene is sulfur-free and to a large extent water-free. However, in a particularly preferred embodiment of the invention the benzene is dehydrated such as by contact with a molecular sieve having pore openings of 5 A. for the removal of any contaminant water and since the recycle cyclohexane is dry, the hydrocarbon feed to the process is substantially anhydrous, that is, contains less than 10 p.p.m. of water.

Since hydrogenation is an exothermic reaction, customarily the feed to the hydrogenation zone is diluted with saturated hydrocarbon for the purpose of absorbing some of the heat of reaction. Preferably the diluent is the saturated product thereby making product separation much more simple. In the processes of the prior art it was customary to use an over-all dilution of about 4 parts cyclohexane per part of benzene. However, because of the high $\Delta T$ in the process of our invention, less diluent is required and the charge may contain 15–35 weight percent benzene with the balance saturated product.

The hydrogen used in the process of our invention should be substantially pure. For this reason it is advantageous to purify the hydrogen by cryogenic means to remove substantially all impurities. This is particularly true when the hydrogen is obtained as by-product from a catalytic reforming unit. Cryogenic purification will then result in the removal of even small amounts of hydrogen sulfide, ammonia and water. Hydrogen purity is not critical but in commercial plants where the hydrogen is recycled, and inerts such as methane can build up, the hydrogen purity should be at least 95%, and preferably at least 99%.

The catalyst used in our process comprises a noble metal such as platinum, palladium or rhodium on a refractory inorganic oxide support such as silica, alumina, magnesia, zirconia and the like and mixtures thereof preferably eta alumina or gamma alumina. The noble metal may be present in an amount between 0.01 and 2% preferably between 0.2 and 1% by weight of the catalyst composite. The catalyst also contains a small amount of thallium or a compound thereof, the thallium content ranging between about 0.01 and 5% by weight of the catalyst composite preferably between 0.1 and 3%. In a preferred embodiment the thallium is present as the oxide although presumably during the onstream period it will be subject to some reduction due to the presence of hydrogen.

The catalyst may be prepared by any of the methods well known in the art. For example, the support, preferably gamma alumina, may be impregnated with a solution of a compound of the catalytic material such as chloroplatinic acid, dried and then impregnated with a solution of a compound of the promoter such as thallium acetate, dried and calcined. Thereafter the catalyst composite may be ground and formed into shaped particles such as spheroids or cylindroids. Preferably, the catalyst is used in the form of a fixed bed of cylindroids. The reactants may be passed upwardly or downwardly through the bed. In a prefererd embodiment, both the hydrogen and hydrocarbon are passed downwardly through the bed in concurrent flow.

The following examples are submitted for illustrative purposes only. In the tables, LHSV represents liquid hourly space velocity in terms of volumes of total hydrocarbon feed per total catalyst volume per hour. The abbreviation N.D. indicates "none detected." The analyses are made by gas chromatography and reported as area percent.

EXAMPLE I

In this example, comparative runs are made using fixed beds of catalysts A and B, catalyst A containing 0.75 wt. percent platinum supported on gamma alumina and catalyst B being composed of catalyst A to which 0.5 wt. percent thallium has been added by impregnation with a solution of thallous acetate. Data on the feeds, reaction conditions and products appear in Table 1 below.

TABLE 1

| | Catalyst | | | |
|---|---|---|---|---|
| | A | | B | |
| Run number | 1 | 2 | 3 | 4 |
| Inlet temperature, °F | 250 | 284 | 250 | 300 |
| Outlet temperature, °F | 520 | 585 | 540 | 600 |
| LHSV, v./v./hr | 4 | 4 | 4 | 4 |
| Pressure, p.s.i.g | 500 | 500 | 500 | 500 |
| Hydrogen/benzene mole ratio | 8:1 | 8:1 | 8:1 | 8:1 |

| Analyses | Feed | | Feed | | | |
|---|---|---|---|---|---|---|
| Hexanes, p.p.m | 269 | 408 | | 751 | 187 | 189 | 262 |
| Methyl cyclopentane, p.p.m | 393 | 7,327 | | 1.6% | 414 | 636 | 1,167 |
| Benzene, percent | 29.2 | N.D | | N.D. | 26.59 | N.D. | N.D. |
| Cyclohexane, percent | 70.7 | 99.2 | | 98.3 | 73.3 | 99.9 | 99.85 |

These runs show that the catalyst containing thallium can produce higher purity cyclohexane at temperatures well above 500° F. than the thallium free catalyst can produce at temperatures of about 500° F.

EXAMPLE II

This example is similar to Example I but differs in that the catalyst is composed of catalyst A to which 1.0 wt. percent thallium has been added. Data on feed, reaction conditions and product appear in Table 2.

TABLE 2

| Run number | 5 | 6 |
|---|---|---|
| Inlet temperature, °F | 290 | 327 |
| Outlet temperature, °F | 492 | 540 |
| LHSV, v./v./hr | 4 | 4 |
| Pressure, p.s.i.g | 500 | 500 |
| Hydrogen/benzene mole ratio | 8:1 | 8:1 |

| Analyses | Feed | | |
|---|---|---|---|
| Hexanes, p.p.m | 254 | 390 | 613 |
| Methyl cyclopentane, p.p.m | 379 | 482 | 603 |
| Benezene, percent | 28.5 | N.D. | N.D. |
| Cyclohexane, percent | 71.5 | 99.9 | 99.9 |

Thallium is also effective in instances where the catalyst also contain rhenium, for example, in a supported platinum catalyst containing rhenium in a rhenium to platinum weight ratio of about 0.2–1.5:1.

EXAMPLE III

In this example catalyst C contains 0.375 wt. percent platinum and 0.2 wt. percent rhenium on gamma alumina, catalyst D being composed of catalyst C to which 0.5 wt. percent thallium has been added. The hydrocarbon feed is a mixture containing 25.5% benzene and 74.4% cyclohexane. Data on the reaction conditions and product are tabulated below:

TABLE 3

| Catalyst | C | D |
|---|---|---|
| Inlet temperature, °F | 280 | 295 |
| Outlet temperature, °F | 570 | 580 |
| LHSV, v./v./hr | 4 | 4 |
| Pressure, p.s.i.g | 500 | 500 |
| Hydrogen: benzene mol ratio | 8:1 | 8:1 |
| Product: | | |
| Benzene, percent | N.D. | 0.01 |
| Cyclohexane, percent | 99.1 | 99.8 |
| Other hydrocarbons | .009 | 0.19 |

Obviously, various modifications of the invention as hereinbefore set forth may be made without departing from the spirit and scope thereof, and therefore, only such limitations should be made as are indicated in the appended claims.

I claim:

1. A process for the production of cyclohexane having a purity of at least 99.5% which comprises forming a mixture consisting essentially of benzene and cyclohexane, passing said mixture in the presence of added hydrogen into a hydrogenation zone and into contact with a supported platinum catalyst promoted with between about 0.01 and 5.0 wt. percent thallium based on the catalyst composite and separating from the hydrogenation zone effluent product cyclohexane having a purity of at least 99.5%.

2. The process of Claim 1 in which the hydrogenation conditions comprise a temperature between about 200 and 600° F.

3. The process of Claim 1 in which the catalyst contains between about 0.01 and 2.0 wt. percent platinum.

4. The process of Claim 1 in which the catalyst contains between 0.1 and 3.0 wt. percent thallium.

5. The process of Claim 1 in which the catalyst support comprises alumina.

6. The process of Claim 1 in which the product cyclohexane purity is at least 99.75%.

7. The process of Claim 1 in which the catalyst contains between about 0.2 and 1.5 parts by weight rhenium per part platinum.

References Cited
UNITED STATES PATENTS

| 2,360,555 | 10/1944 | Evans et al. | 260—666 A |
| 3,600,301 | 8/1971 | Rausch | 260—667 |
| 3,700,742 | 10/1972 | Hayes | 260—667 R |

PAUL M. COUGHLAN, Jr., Primary Examiner

V. O'KEEFE, Assistant Examiner

U.S. Cl. X.R.

252—466 PT; 260—683.9